No. 860,291.   
PATENTED JULY 16, 1907.
W. GARDINER.  
STORAGE BATTERY.  
APPLICATION FILED MAY 20, 1905.
3 SHEETS—SHEET 1.
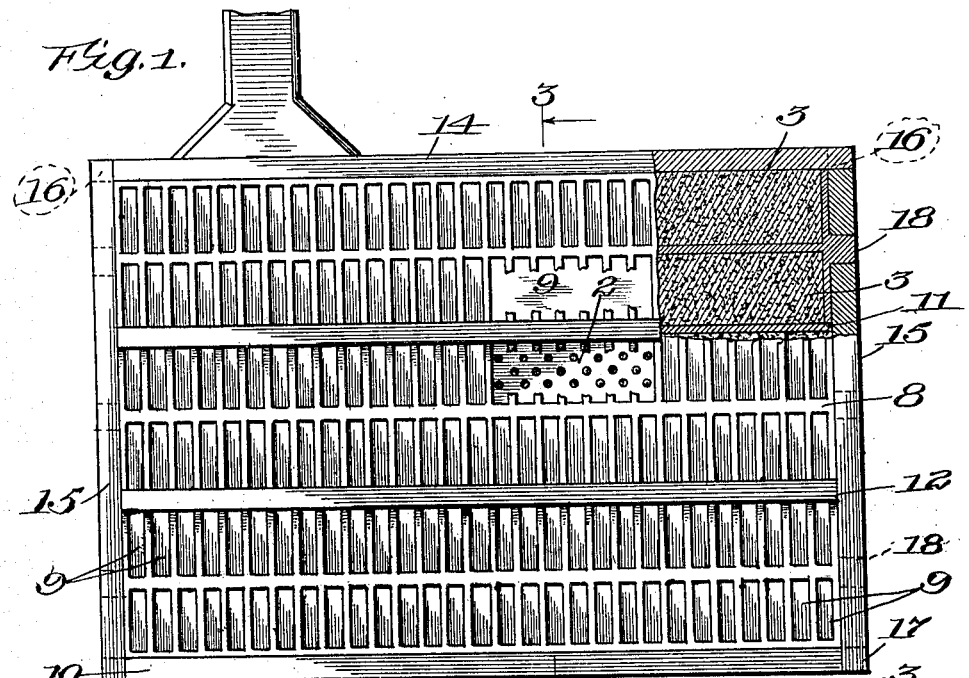
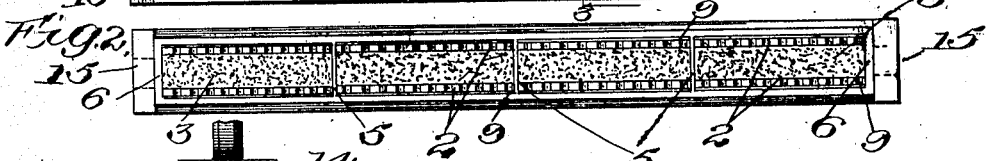
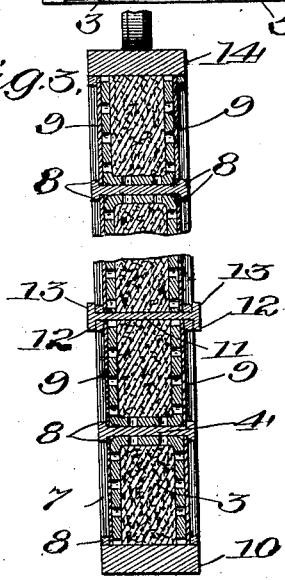
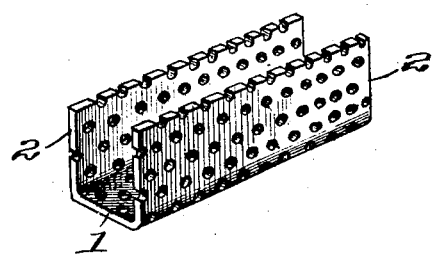
Witnesses:  
Inventor:  
Wm Gardiner  
by Brown, Darby & Hopkins  
Attys No. 860,291. PATENTED JULY 16, 1907.
W. GARDINER.
STORAGE BATTERY.
APPLICATION FILED MAY 20, 1905.

3 SHEETS—SHEET 2.

Witnesses:
Inventor:
Wm Gardiner
by Brown, Darby & Hopkins
Attys

No. 860,291.

PATENTED JULY 16, 1907.

W. GARDINER.
STORAGE BATTERY.
APPLICATION FILED MAY 20, 1905.

3 SHEETS—SHEET 3.

Witnesses:

Inventor:
Wm Gardiner
by Brown, Darby & Hopkins
Attys.

UNITED STATES PATENT OFFICE.

WILLIAM GARDINER, OF CHICAGO, ILLINOIS, ASSIGNOR TO C. P. STRINGFIELD, OF CHICAGO, ILLINOIS.

STORAGE BATTERY.

No. 860,291.  Specification of Letters Patent.  Patented July 16, 1907.

Application filed May 20, 1905. Serial No. 261,300.

To all whom it may concern:

Be it known that I, WILLIAM GARDINER, a citizen of the United States, residing at Chicago, county of Cook, and State of Illinois, have invented certain new and useful Improvements in Storage Batteries, of which the following is a full, clear, and exact specification.

My invention relates to storage batteries, and has especial reference to the plates.

The primary object of the invention is to provide an improved form and construction of plate for a storage battery, which will retain the particles of the active material and prevent the same from washing into the bottom of the cell, and thereby short-circuiting the battery.

Another object of the invention is to provide a storage battery plate of an improved form and construction in which the maximum area of active material will be presented to the action of the battery solution without allowing the detached particles to settle into the bottom of the cell.

A further object of the invention is to make an improved plate for storage batteries which shall be of a lasting and economical construction.

With a view to the attainment of these ends, and the accomplishment of certain other objects which will hereinafter appear, the invention consists in features of novelty which will now be described with reference to the accompanying drawings, and more particularly pointed out in the claims.

Figure 5:
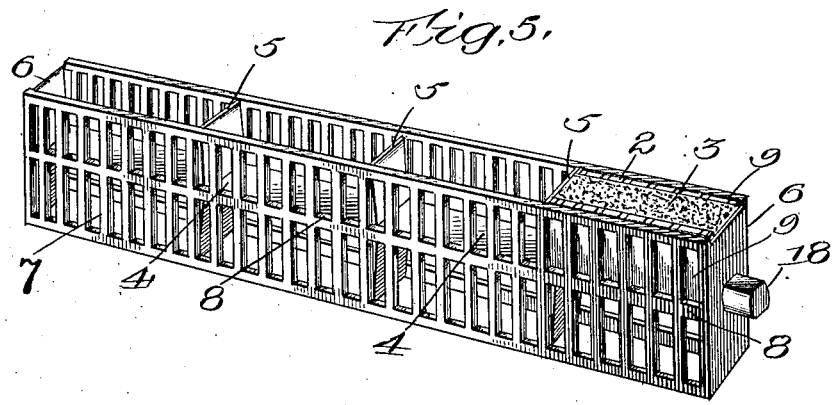
Figure 6:
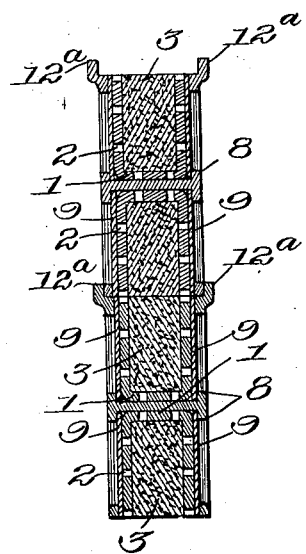
Figure 7:
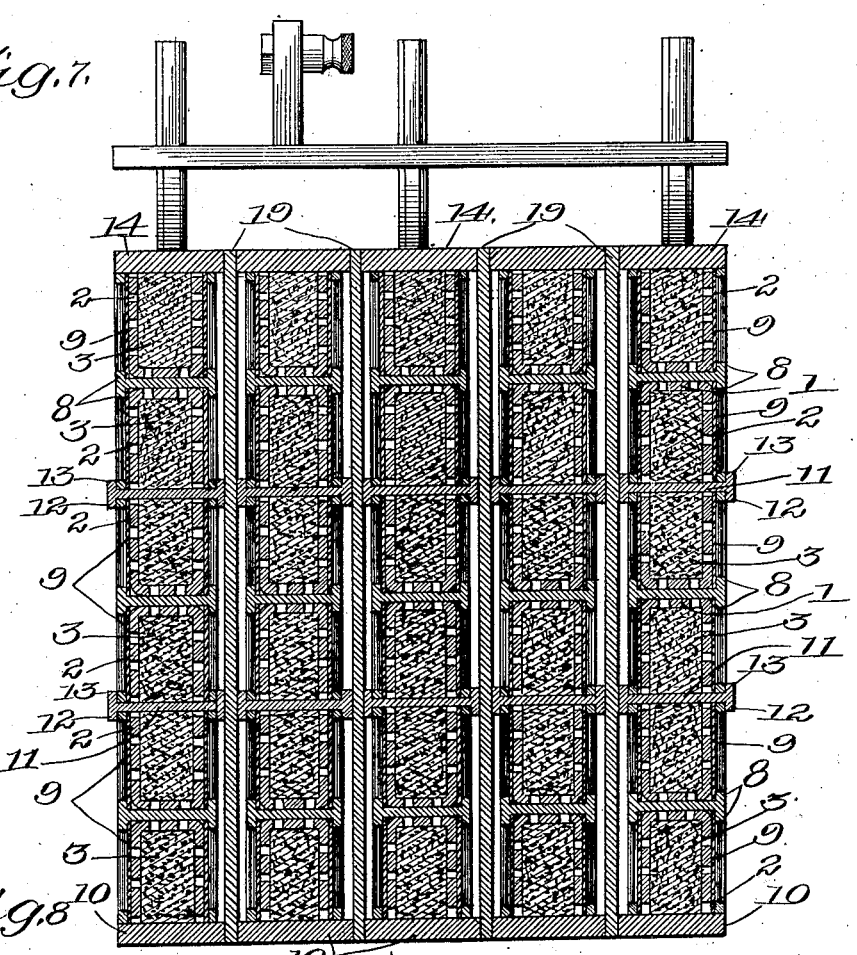
Figure 8:
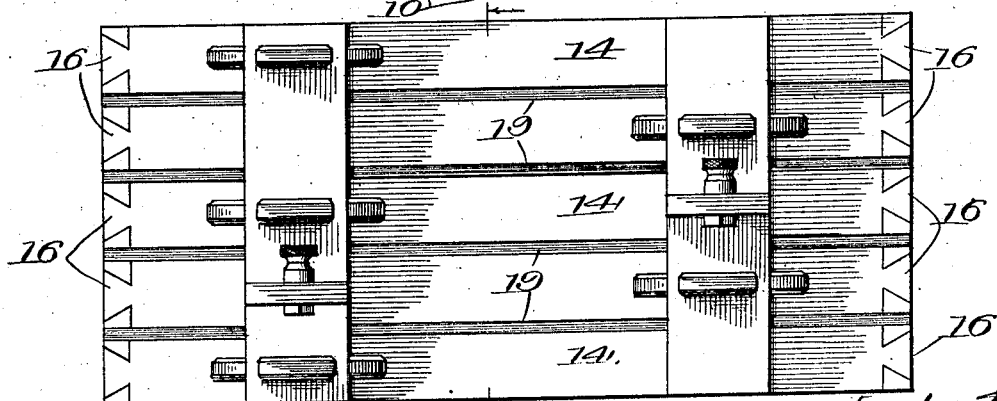

In the said drawings, Figure 1 is a side elevation of my improved battery plate, partially broken away and partially in section; Fig. 2 is a plan view thereof, with the cap removed; Fig. 3 is a cross-section on the line 3, 3, Fig. 1, partially broken away; Fig. 4 is a detail perspective view of one of the holders for the active material; Fig. 5 is a perspective view of one of the sections. Fig. 6 is a vertical cross-section showing a modification. Fig. 7 is a vertical cross-section of a number of plates, showing a further modification. And Fig. 8 is a plan view thereof.

In this exemplification of my invention, the active material is placed in a plurality of independent holders, and these in turn are placed within a cage, which constitutes the body of the plate, and which may be duplicated or repeated in the battery as often as need be for creating a plate of the desired size, and between the cage and the holder, or at other point between the active material and the cage, is placed a diaphragm or sheet of porous material which will absorb the liquid of the battery and allow the same to have free access to the active material, while preventing the detached particles of the latter from finding their way into the bottom of the cell, or other place where they are liable to collect and short-circuit the battery.

In Fig. 4 is shown one of the holders, which may be conveniently formed of a sheet of foraminous metal, so bent as to constitute a bottom 1 and side walls 2, and into this holder is molded or otherwise placed the active material 3, thus producing a block of the active material, which may be conveniently placed within the cage, and as many of these blocks may be employed as are necessary or desirable for producing the requisite area or size of plate.

The cage may consist of any suitable holder having openings through the side or sides, whereby the solution of the battery may gain ready access to the active material 3 through the apertures of the foraminous holder 1, 2; in this particular exemplification of the invention, the cage comprises a bottom 4, end walls 5, 6, and grated or apertured side walls composed of upright and horizontal bars 7, 8.

Between the side walls 2 of the holders and the inner sides of the upright bars 7 are inserted diaphragms 9, which are composed of any suitable porous or absorbent material, such, for example, as paper made from wood pulp, or any other material which possesses the property of being absorbent without being susceptible to the action of the acids or other solution used in the cell. As better shown in Fig. 3, the lower edges of these diaphragms 9 are confined behind the horizontal bars 8 of the cage, so that the active material which may become detached may not escape from the cage and settle in the bottom of the cell.

In practice it is preferable to employ a cage having a large number of compartments, each containing one of the holders 1, 2, and it is also desirable to form these compartments in groups or series, placing them in tiers one upon the other. Thus, by reference to Fig. 3 of the drawing, it will be seen that the portion designated as a bottom 4 constitutes the bottom for the second tier of compartments and the top for the bottom tier, and this portion 4 extends throughout the entire width of the plate. Thus, each section of the plate comprises two horizontal rows of these compartments, the lower row of which is inverted, but in practice the inverted side is closed by an additional member, of any suitable form, extending the entire length of the plate. In this exemplification, the bottom row of compartments is closed by a bottom plate 10, upon which all of the sections rest, while the top row of the same section and the bottom row of the next section above are closed by a cap 11, which extends the full length of the plate, and is formed with longitudinal flanges 12, 13, extending downwardly and upwardly, respectively, so as to overlap the horizontal bars 8 of the cages, and thereby hold the sections one upon the other, and prevent lateral movement thereof. These sections may be repeated, one upon the other, as often as desired, one of the caps 11 being interposed between them; and the compartments of the top section are closed by a cap-plate 14, extending throughout the length of the plate and secured at its ends, like the bottom plate 10 and the various compartment sections, to upright or end plates 15 by any suitable means, as, for example, tenons or pins 16, 17, on the plates 14, 10, respectively, and 18 on the end walls 6 of the compartment sections. After these pins have been inserted and the sections firmly pressed together one upon the other into their caps 11, the joints may be lead-burned or otherwise secured.

In the modification of the invention shown in Fig. 7, in which a series of plates is illustrated, the plates are separated one from the other by diaphragms or partitions 19, which extend from top to bottom and end to end, and are composed of the aforesaid absorbent material, or any other suitable substance, and against which the flanges 12, 13, of the caps 11 impinge, so that the plates are held apart, and at the same time there are constituted throughout the entire area of each plate a large number of small pockets or recesses, wherein a quantity of the solution of the cell is held in direct contact with the inner diaphragm 9, and consequently in close relation to the active material on the other side thereof, thereby bringing a large volume of the solution of the battery into intimate association with almost the entire area of each of the plates. These various recesses or compartments to which reference has just been made are constituted, it will be seen, by the opposed surfaces of the diaphragms 9, 19, and the side flanges 12, 13, of the caps 11.

In the form shown in Fig. 6 the construction of the sections differs from the other forms, in that the caps 11 and flanges 12, 13, are dispensed with, and in lieu thereof, flanges 12ª are cast or formed directly on the section itself, at either top or bottom, for receiving the bottom or the top, as the case may be, of the contiguous section.

Having thus described my invention, what I claim as new therein and desire to secure by Letters Patent is:

1. In a battery plate, the combination of a metallic cage, a metallic foraminous holder inserted therein, the active material contained within said holder, and an absorbent diaphragm inserted between the holder and the cage.

2. In a battery plate, the combination of a series of metallic cage-like compartments, metallic apertured holders individual to said compartments in electrical contact therewith, the active material in said holders, and a porous diaphragm inserted between the active material and the sides of the said cage-like compartments.

3. In a storage battery plate, the combination of metallic cage-like compartments each comprising integral apertured side walls, end walls, and a bottom, a metallic foraminous holder for the active material situated in said compartment and in electrical contact therewith, and pervious diaphragms interposed between the sides of said holder and the apertured walls of the compartment.

4. In a storage battery plate, the combination of a series of integral metallic sections bound together and each comprising a plurality of cage-like compartments, each of said compartments being composed of integral apertured side walls, end walls, and a bottom, a metallic foraminous holder for the active material situated in each of said compartments and in electrical contact therewith, and pervious diaphragms interposed between the sides of said holder and the apertured walls of said compartment.

5. In a storage battery plate, the combination of metallic cage-like compartments comprising integral apertured side walls, end walls, and a bottom, a metallic foraminous holder for the active material situated in said compartments and in electrical contact therewith, and pervious diaphragms interposed between the sides of said holder and the apertured walls of the compartment, said side walls having imperforate portions for a distance above said bottom of the compartment, and the diaphragms being extended down behind said imperforate portions, whereby the active material will be prevented from washing out past the edge of the diaphragm.

6. In a storage battery plate, the combination of a series of integral metallic sections bound together and each comprising a plurality of cage-like compartments, each of said compartments being composed of integral apertured side walls, end walls, and a bottom, a metallic foraminous holder for the active material in each of said compartments and in electrical contact therewith, and pervious diaphragms interposed between the sides of said holder and the apertured walls of the compartment, and longitudinal side flanges supported directly by one of said sections and overlapping the next.

In witness whereof, I have hereunto set my hand this 13th day of May 1905, in the presence of the subscribing witnesses.

WILLIAM GARDINER.

Witnesses:
FRANCIS A. HOPKINS,
E. C. SEMPLE.